Jan. 21, 1969  K. F. SCHOCH  3,422,765

SUPERCONDUCTING LIQUID HELIUM PUMP

Filed March 24, 1967

Inventor:
Karl F. Schoch,
by American Mitchell
His Attorney.

United States Patent Office 3,422,765
Patented Jan. 21, 1969

3,422,765
SUPERCONDUCTING LIQUID HELIUM PUMP
Karl F. Schoch, Scotia, N.Y., assignor to General Electric Company, a corporation of New York
Filed Mar. 24, 1967, Ser. No. 625,724
U.S. Cl. 103—53
Int. Cl. F04b 17/04
7 Claims

ABSTRACT OF THE DISCLOSURE

A double acting superconducting liquid helium pump, the piston of which is made of niobium and suspended in a cylinder tube. At each end of the piston are double acting valves to allow liquid helium to be pumped in and out as the piston reciprocates in its tube. The center of the piston is a flange which is acted upon by laterally spaced coils to give the piston its reciprocatory motion.

This invention relates to a pump and particularly to a pump for pumping cryogenic liquids.

This device is adapted for use as a pump in a cryogenic liquid transfer device such as that described in the application entitled, "Liquid Transfer System," filed by Karl F. Schoch and Andrew I. Dahl, Ser. No. 572,526 on Aug. 15, 1966 and assigned to the General Electric Company.

The transfer of liquid helium from a supply Dewar to another vessel is a frequent requirement in cryogenic work. Liquid helium flow is presently obtained by raising the gas pressure in the supply container using a helium gas from a supply at room temperature. This rise in pressure causes liquid helium to be forced through a transfer tube from the supply Dewar to the other vessel. The use of this technique is not particularly favorable since it is difficult to control and since the warm gas over the helium results in further evaporation and loss of the liquid helium. Finally, release of pressure at the end of the operation causes a loss of evaporated liquid helium.

It is an object of this invention to provide a highly reliable long life cryogenic pump.

It is another object of this invention to provide a pump which can operate over a wide range of frequency.

It is a further object of this invention to provide a pump that has the capability of operating efficiently at very low temperatures.

For a discussion of general principles of cryogenics see "Cryogenic Engineering," by Russell B. Scott, published by D. Van Nostrand Company. For a further discussion of the cryogenic liquid transfer problem reference is made to "Superconductive Magnets," by D. Bruce Montgomery in the publication "Mechanical Engineering," of March 1967.

In brief, my invention is a double acting superconducting liquid helium pump the piston of which is made of niobium. The piston is suspended in a cylindrical tube and at each end of the tube are double acting valves to allow liquid helium to be pumped in and out as the piston reciprocates in its tube. At the center of the piston is a flange which is acted upon by laterally spaced coils to give the piston its reciprocatory motion.

The above and other features of this invention will be fully understood from the following detailed description and the accompanying drawings, in which.

Figure 1:
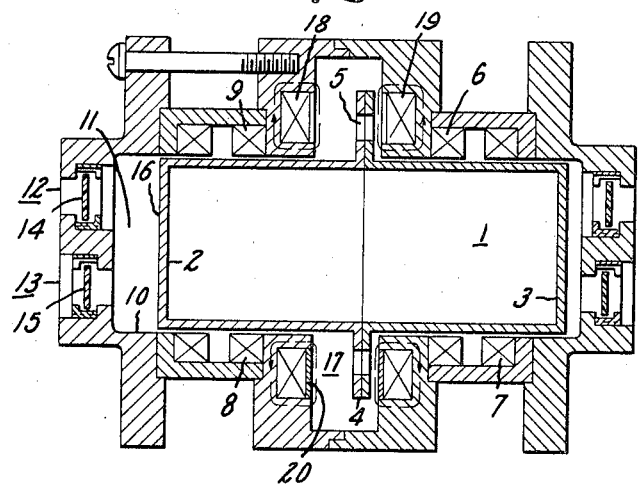
FIGURE 1 is a cross-sectional view of my superconducting pump.

My pump as shown in FIGURE 1 consists of a housing with six parts arranged for convenience of machining and assembly. This double acting pump is symmetrical about a plane extending laterally through it when the piston is in a centered position. For convenience, the right hand side will be described. The pump piston 1 is of a superconducting material such as niobium and is formed of two hat shaped members 2, 3 where each member is cylindrical in shape and the flange 4 at its edge is round. These members are welded or otherwise attached to each other. In each flange are holes 5 to allow liquid to pass from one side of the flange to the other. This piston 1 is suspended inside the casing without direct mechanical contact to the casing. A number of coils 6–9 mounted inside the casing and about the piston generate electromagnetic flux so as to magnetically suspend the piston without direct contact with the coils or walls 10 of the casing. The field strength of the coils and temperature of the piston must be regulated so that the material of the piston remains superconducting and suspended from the cylinder walls. Thus, the pump may operate efficiently. The distance between piston and casing walls is held to a small amount to avoid turbulence. At each end of the pump cylinder 11 is a pair of one way valves 12, 13. These may be made in the form of two nylon disks 14, 15 set in the cylinder head as shown in FIGURE 1. A one way nylon disk valve 12 arranged so that the liquid passing disk 14 will go into the hollow space at the end of the cylinder 11 and as the piston goes to the other end of the cylinder or as the piston reciprocates and the piston reaches the end of its traverse, valve 12 will snap shut and valve 13 will now open to allow the cryogenic liquid to be forced from the head of the cylinder and out through the valve into whatever storage container is desired. The other end of the pump will operate in an analogous way. The output of one end of the pump may be connected in series or parallel with the other end depending on whether pressure or volume of flow is needed.

A certain amount of cryogenic liquid will slip past the piston head 16 and into the space 17 through which the flange 4 is reciprocated. In order to avoid liquid lock space 17 is made considerably larger than the flange so that the cryogenic liquid will swish past the outer edge of the superconducting flange 4 as it is reciprocated back and forth under the influence of the varying current strengths in the superconducting coils. The flange has holes 5 in it to allow the cryogenic liquid to flow through the flange as it moves back and forth.

Coils 18 and 19 are disposed one on each side of the superconducting flange and are mounted in the wall of the flange space at a distance from the flange so that alternating surges of electric current through these coils will cause the flange to move in one direction or the other. On the external face of each coil is superconducting ring 20 having a radial slot, the ring being placed there to avoid flux loss in the coil.

A weak DC current is maintained in each of coils 18 and 19 at all times to prevent piston flange contact with the side of the flange space when the piston is at one end or the other of its traverse. The temperature of the superconducting piston and the magnetic intensity of the field generated by the coils must be kept within limits to preserve the superconducting quality of piston 1 and piston flange 4.

Figure 2:
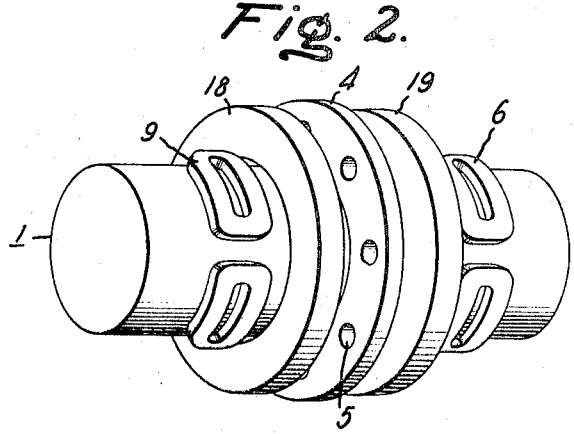
FIGURE 2 is a perspective view of the double acting piston showing the niobium flange and showing in phantom view the coil system for suspending and actuating the piston.

FIGURE 2 shows the configuration of the coils and the superconducting piston for purposes of illustration. The coils 6 and 9 are positioned about the piston in the general position in which they are located in the casing and are wound so as to support the superconducting piston free of physical contact with the coils and the walls of the casing in order that there will be no sliding friction as the piston travels forward and back. The unnumbered coils shown in FIGURE 2 are two of the total of eight supporting coils surrounding the piston in this embodiment. In this view one can also see the holes 5 in the flange of the piston.

An advantage of my invention is that it can operate over a wide frequency range.

Another advantage is that it has a minimum of moving parts and has no flexural parts. Thus, the piston motion is free of metallic friction and there is no metal fatigue.

An advantage peculiar to the cryogenic art is that by using a piston made of a superconductor there is little or no heat generated by the magnetic field to cause liquid loss as would be the case if an ordinary resistive metal were used. Helium, for example, has a negligible heat of vaporization and small additions of heat would cause large quantities of helium to change from liquid to gas.

The foregoing is a description of an illustrative embodiment of the invention and it is applicant's intention in the appended claims to cover all forms which fall within the scope of the invention.

What I claim as new and desire to secure by Letters Patent of the United States is:

1. A pump for cryogenic liquid having:
a cylinder,
superconductive piston means mounted in said cylinder,
valve means for allowing fluid flow into and out of the ends of said cylinder,
first coil means for supporting said piston free of contact with said cylinder, and
second coil means for reciprocating said piston means in said cylinder.

2. A pump for cryogenic liquid as set forth in claim 1 in which:
said piston has a flange extending radially about the center of said piston and movable in a space in the cylinder casing.

3. A pump for cryogenic liquid as set forth in claim 2 in which:
said second coil means is mounted in the walls of said flange space for imparting reciprocating motion to said piston.

4. A pump for cryogenic liquid as set forth in claim 1 in which said valve means in each end of said cylinder comprises:
a pair of one way valves; one valve for allowing the flow of liquid into said cylinder and another valve for allowing the flow of liquid out of said cylinder.

5. A pump for cryogenic liquid as set forth in claim 4 in which the magnetic intensity generated by said coils and the temperature of said piston are less than the critical point for the piston material.

6. A pump for cryogenic liquid having:
a piston of superconducting material,
a cylinder surrounding said piston having space at each end for fluids,
valves in each end of the cylinder for selectively allowing fluid to pass in and out of said cylinder space,
coils in the wall of said cylinder for suspension of said piston in said cylinder,
actuating means including a flange of superconducting material attached to the center of said piston, and coils spaced laterally from said flange for generating a magnetic field to cause said piston to reciprocate longitudinally in said cylinder.

7. A pump for cryogenic liquid as claimed in claim 6 in which said flange has holes located so that the cryogenic fluid may flow through them and said cylinder has annular space in its wall of sufficient size that said flange may reciprocate in it without liquid lock when said piston oscillates back and forth.

References Cited

UNITED STATES PATENTS

| 2,701,331 | 2/1955 | Holst | 103—53 XR |
| 2,833,220 | 5/1958 | Robinson et al. | 103—53 |
| 3,098,189 | 7/1963 | Buchhold. | |

ROBERT M. WALKER, *Primary Examiner.*

U.S. Cl. X.R.

310—18; 308—10